United States Patent [19]

Shigezawa et al.

[11] Patent Number: 5,088,835
[45] Date of Patent: Feb. 18, 1992

[54] REUSABLE PROBE CONNECTOR APPARATUS

[76] Inventors: Gordon Shigezawa, 34 Cresthaven, Irvine, Calif. 92714; Anthony V. Beran, 3118 Alpine, Santa Ana, Calif. 92704

[21] Appl. No.: 636,928
[22] Filed: Dec. 31, 1990
[51] Int. Cl.⁵ .................................................. G01K 7/12
[52] U.S. Cl. .................................... 374/181; 136/230; 439/620
[58] Field of Search ........................ 374/179, 181, 182; 439/620; 136/230; 128/736

[56] References Cited
U.S. PATENT DOCUMENTS

| | | | |
|---|---|---|---|
| 3,145,329 | 8/1964 | Deakin et al. | 174/28 X |
| 3,282,107 | 11/1966 | Ekstrom, Jr. | 374/179 X |
| 3,903,743 | 9/1975 | Noller | 374/181 |
| 4,133,700 | 1/1979 | Hollander et al. | 374/181 |
| 4,221,923 | 9/1980 | Nagao et al. | 374/179 X |
| 4,588,308 | 5/1986 | Saito | 374/181 |

Primary Examiner—Daniel M. Yasich
Attorney, Agent, or Firm—Price, Gess & Ubell

[57] ABSTRACT

A reusable cable apparatus for interfacing disposable temperature probes with a patient monitor. One reusable cable connects a thermocouple probe to the patient monitor and has a phone plug connection wherein a cold junction and cold junction compensation is located. A second reusable cable connects a thermistor probe to the patient monitor through a similar phone plug. Circuit means in the patient monitor receives either phone plug and produces an output signal which is substantially the same regardless of whether the thermocouple and first reusable cable or thermistor and second reusable cable are connected. The effect of secondary thermocouple junctions in interconnecting connector shells is substantially eliminated by connecting lead wires to contact pins such that the secondary junctions are physically close to one another.

13 Claims, 3 Drawing Sheets

REUSABLE PROBE CONNECTOR APPARATUS

BACKGROUND OF THE INVENTION

1. Field of the Invention

The subject invention relates to temperature sensing instrumentation and, more particularly, to improved apparatus for connecting temperature sensor probes of the thermistor and thermocouple type to a patient monitor apparatus.

2. Description of Related Art

Thermocouple and thermistor probes for use with temperature sensing apparatus are known, in the prior art. In U.S. patent application No. 107,989, cold junction compensation circuitry for a thermocouple is disclosed. While the subject matter of that patent application has provided advantageous improvements, it has appeared desirable to the inventors to further improve the ability of instruments to accept either thermistor or thermocouple type probes.

SUMMARY OF THE INVENTION

According to the invention an interconnecting cable apparatus is disclosed which permits connection of either a disposable thermocouple or a disposable thermistor probe to an instrument simply by changing the interconnecting cable. According to a feature of the invention, the apparatus may include first and second reusable cables, each employing a connector at either end, one of the connectors adapted to plug into a temperature monitoring apparatus and the other adapted to connect to a respective temperature sensing element, i.e., a thermocouple probe or a thermistor probe.

In a preferred embodiment, the cable for connecting a thermocouple probe mounts the cold junction and cold junction compensation means in a phone plug connector. Means are supplied for isolating the cold junction and cold junction compensation means. As another feature, means are provided for minimizing the effects of secondary thermocouple junctions formed in the connectors.

BRIEF DESCRIPTION OF THE DRAWINGS

The just-summarized invention will now be described in detail in conjunction with the drawings, of which.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a readily manufacturable, reusable cable apparatus.

In U.S. patent application Ser. No. 107,989, a means for compensating the potential of a cold junction is described using a thermistor as the cold junction temperature sensor. The location of the cold junction and the cold junction temperature sensor is in the connector terminating the reusable extension cable mated to the disposable temperature probe connector, in turn connected to the hot junction as in FIG. 3 of said Application.

The connector topology of the preferred embodiment described hereafter achieves the following goals:

1. Cold junction compensation external to the measuring instrument and located in a reusable thermocouple interconnection cable. Compensation is achieved by use of a cold junction temperature sensor (thermistor in this case) in a circuit that produces a voltage that changes with equivalent slope (change in voltage versus temperature) opposite to that of the thermocouple cold junction (by default equivalent to that of the thermocouple hot junction).
2. Alternate connection to the instrument such that a disposable temperature probe of a different type may be connected to the same instrument through the same instrument interconnection interface. The different type of sensor may comprise a thermistor located at the temperature monitoring location. The resulting thermistor probe circuit eliminates all thermocouple junctions and exhibits a voltage change equivalent to that of the thermocouple sensor circuit comprised of the series connected potentials of the cold junction compensator, cold junction, and hot junction.
3. The connectors used on both ends of the cable are of conventional design and do not require thermocouple (e.g., copper, and constantan) materials in their construction.
4. Connection to the disposable connector is with conventional pin and socket connectors using non-thermocouple materials.
5. The construction allows cost effective manufacture of both the reusable extension cable and the disposable probe connectors.

Figure 1:
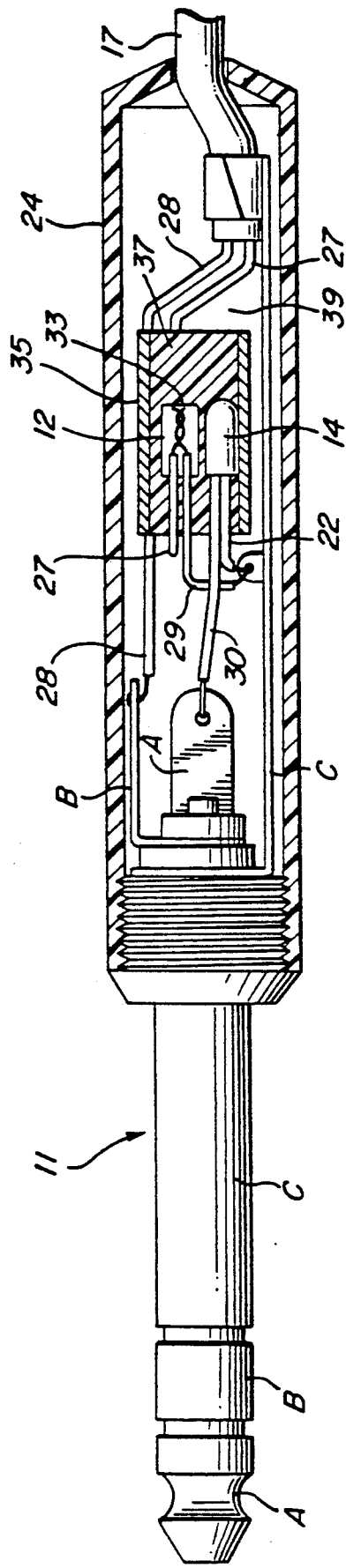
FIG. 1 is a side sectional schematic view of a portion of an interconnecting cable according to the preferred embodiment.

FIG. 1 illustrates a connector or connector means according to the preferred embodiment including a housing 24. The connector of FIG. 1 employs a conventional ¼-inch phone plug 11 in which a copper wire 28, a cold junction 12, a cold junction lead 27, and a cold junction temperature sensor 14 are housed. The phone plug 11 connects to a temperature monitoring instrument 23, for example, a patient monitor apparatus in a medical environment.

Figure 2:
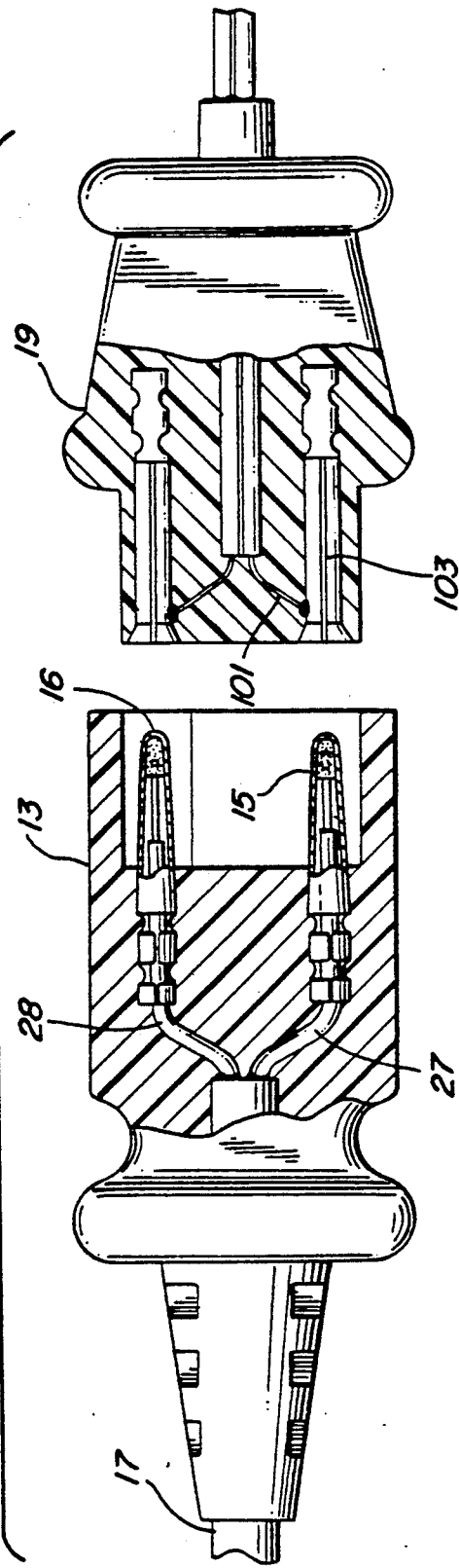
FIG. 2 is a side sectional view illustrating the remainder of the cable of FIG. 1 and a cooperating disposable connector.
Figure 3:
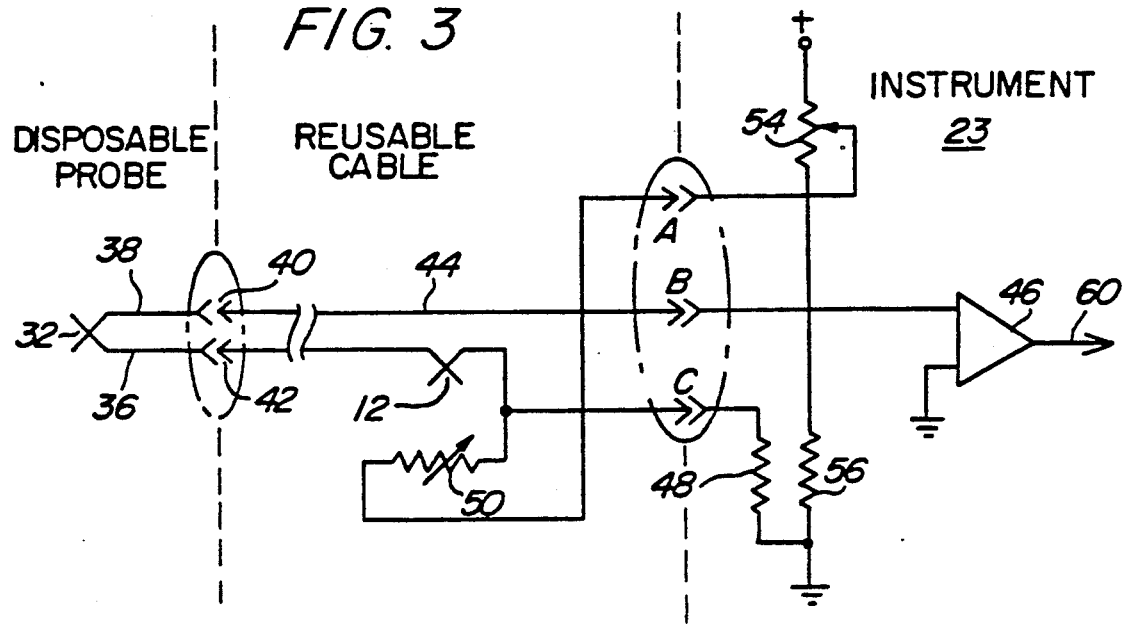
FIG. 3 is an electrical schematic diagram illustrating interconnection of the reusable cable of FIGS. 1 and 2.
Figure 4:
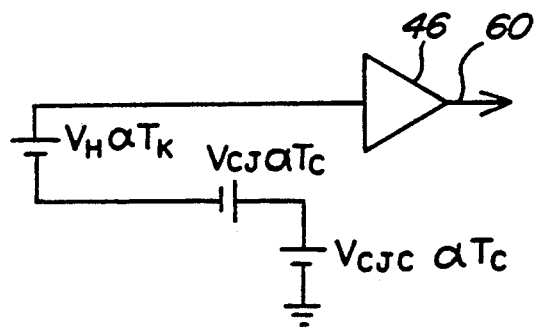
FIG. 4 is an electrical circuit schematic equivalent of the circuit of FIG. 3.
Figure 5:
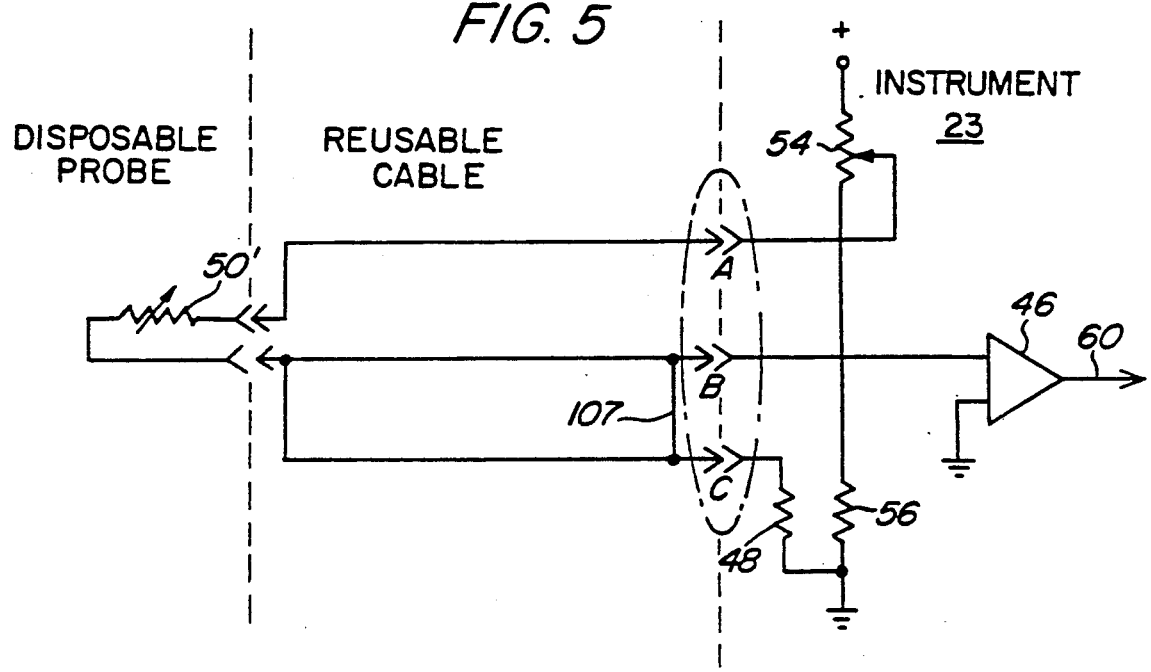
FIG. 5 is a schematic diagram illustrating interconnection of a second reusable cable for use with a thermistor.
Figure 6:
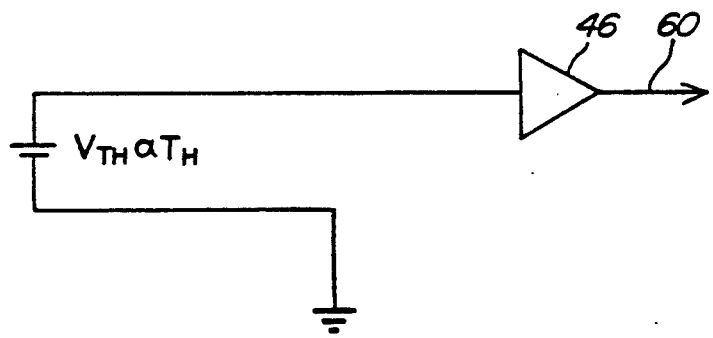
FIG. 6 is a circuit schematic equivalent to the circuit of FIG. 5.

Connection of the copper wire 28 and lead 27 to a disposable probe sensor, e.g., containing hot junction 32 of FIG. 3, is accomplished with commercially available pin and socket contacts housed in respective conventional connector shells 13, 19 shown in FIG. 2. The commercially available hard connector shell 13 is preferably used to house the male contact pins 15, 16. The disposable connector 19 is insert molded to match the design of the shell 13. The interface between a reusable cable 17 and a disposable connector 19, therefore, is conventional in external mechanical (dimensional) design.

The phone plug 11 allows the reusable cable 17 to be disconnected from the instrument 23. Conventional thermocouple interconnection techniques employ a special connector in which the contact materials used to make electrical interconnection are of the same materials as the thermocouple. For example, in a typical conventional apparatus, one connector contact would have to be copper and the other constantan. The cold junction and cold junction compensator temperature sensors are then located in the interior of the instrument. These special connectors are usually quite costly and are specific in use with thermocouple-type probes.

As indicated above, the connector of the preferred embodiment uses a conventional ¼-inch stereo phone plug 11, which is available from many sources (e.g., from Mouser Electronics, Mansfield, Tex.). Because the phone plug 11 does not employ thermocouple metal materials such as constantan, the cold junction 12 and cold junction temperature sensor 14 must be located outside the instrument, in this case within the housing 24 provided by the ¼-inch phone plug 11.

The cold junction 12 is formed by connecting the constantan wire 27 of the extension cable 17 to a copper lead 29. The copper lead 29 is connected to one thermistor lead 22 at terminal "C" of the phone plug 11. The copper cable lead or wire 28 is connected to terminal "B" of the phone plug 11, while a second thermistor lead 30 is connected to terminal "A" of the phone plug 11.

The cold junction 12 is insulated with a plastic sleeve 33 and potted together with the cold junction temperature sensor (thermistor) 14 in a high heat conductivity epoxy 37. A metal sheath 35 surrounds the epoxy 37. The assembly within the metal sheath 35 assures that the temperature of the cold junction 12 matches the temperature of the cold junction temperature sensor 14 and that the entire assembly temperature is not appreciably affected by fast in ambient temperature changes by virtue of its combined thermal mass. The assembly is positioned in the ¼-inch phone plug 11 within an air space 39 which further insulates the assembly from fast changes in ambient temperature.

The reusable cable/disposable probe connections are performed by a stock pin and socket connector design (Molex Inc., Lisle, Ill.). Such stock connectors typically employ brass pins and sockets. A thermocouple junction exists between the cable wires and the pin material and between the disposable probe wires and the pin material. However, as long as the temperature difference along the axis of the cable wire and probe wire is small, no net effect occurs by the inclusion of these secondary thermocouple junctions. The connector of the preferred embodiment reduces the axial temperature difference by soldering the lead wire, e.g. 27, inside the pin, e.g. pin 15, and welding the probe wire, e.g. 101, close to the open end of the contact, e.g. 103, such that the cable and probe wires and their associated secondary junctions to the pin/contact materials are physically close together when the two connectors 13, 19 are mated. The insert molded plastic body of the disposable connector 19 provides additional insulation and thermal mass around the secondary junctions, further insulating them from fast changes in ambient temperature.

The function of the instrument 23 with either a thermocouple or a thermistor probe is shown in FIGS. 3–6.

The thermocouple circuit (FIGS. 3, 4) comprises the series strung voltages of the thermocouple hot junction (Vh), thermocouple cold junction (Vc), and the voltage developed across the thermocouple cold junction compensator (Vcjc). As mentioned previously and described in the prior application, the elements of the cold junction compensator, i.e., circuit means 54, 56, 48, and thermistor 50 are chosen so as to produce a voltage drop across resistor 48 (Vcjc) that changes in opposition to the voltage of the cold junction 12. Since the cold junction 12 is physically comprised of the same materials as the hot junction 32, the cold junction compensator slope (voltage change versus temperature change) matches that of the input thermocouple type.

The much simpler thermistor circuit (FIGS. 5, 6) eliminates all junctions and simply measures the voltage drop across the resistor 48. The voltage across the resistor 48 (Vth) changes as a function of the temperature of the hot site thermistor temperature sensor 50'. No changes in the internal circuits of the instrument are necessary because the change in voltage of the thermistor circuit matches the change of the compensated thermocouple hot junction. A connection 107 (FIG. 5) is made between parts B and C of the ¼-inch phone plug 11, either where the disposable probe 50' plugs into the end of the reusable extension cable, or at the end of the reusable cable where the phone plug 11 is attached (this can be achieved by hardwiring the B and C terminals together or by using a monoaural plug). Other manufacturers of reusable thermistor sensor use a monaural ¼-inch phone plug, allowing compatability of the present invention with those sensors.

The ability of the present invention to accept either thermocouple or thermistor-type probes with only a change in the interconnecting cable, which is a significant advantage.

Those skilled in the art will appreciate that various adaptations and modifications of the just-described preferred embodiment can be configured without departing from the scope and spirit of the invention. In particular, while constantan and copper have been disclosed as particular thermocouple materials in the foregoing discussion, those skilled in the art will appreciate that various other thermocouple materials may be used in various embodiments according to the invention. Therefore, it is to be understood that, within the scope of the appended claims, the invention may be practiced other than as specifically described herein.

What is claimed is:

1. A reusable interconnection cable apparatus for interconnecting a thermocouple probe sensor to a temperature monitoring apparatus comprising:

a constantan wire;

a copper wire;

a copper lead having first and second ends;

a cold junction formed between said constantan wire and the first end of said copper lead;

cold junction compensation means for canceling the voltage developed by said cold junction, said compensation means being connected to the second end of said copper lead within said connector housing, said cold junction compensation means providing a third lead;

a first connector means having a housing for housing said constantan and copper wires, said cold junction, said cold junction compensation means, and said third lead;

said first connector means further including means for electrically connecting said third lead and said copper wire with said temperature monitoring apparatus;

a cable means for conducting said constantan wire and said copper wire out of said first connector means; and a second connector means located at said second end of said cable means for connecting said constantan wire and copper wire with said thermocouple probe sensor.

2. The apparatus of claim 1 further including means for isolating said cold junction from ambient temperature changes.

3. The apparatus of claim 2 wherein said isolating means includes:

a heat conductive potting mans for positioning said compensation means and said cold junction and for conducting heat therebetween such that the temperature at said compensation means matches that at said cold junction.

4. The apparatus of claim 3 further including an insulating sleeve disposed around said cold junction, and wherein said potting means positions said sleeve adjacent said compensation means.

5. The apparatus of claim 4 wherein said first connector means comprises a ¼-inch phone plug.

6. The apparatus of claim 3 wherein said isolation means further comprises:

a metal sheath encasing said heat conductive potting means, said metal sheath being spaced apart from said housing so as to create an isolating air space therebetween.

7. The apparatus of claim 6 wherein said second connector means includes first and second pin means and means for interconnecting said first and second pin means, respectively, to said constantan wire and said copper lead, thereby forming first and second secondary thermocouple junctions wherein said first and second junctions are located adjacent the end of the respective first and second pin means for minimizing the effect of said secondary thermocouple junctions.

8. The apparatus of claim 1 wherein said second connector means includes first and second pin means and means for interconnecting said first and second pin means, respectively, to said constantan wire and said copper lead, thereby forming first and second secondary thermocouple junctions, and wherein said first and second junctions are formed adjacent the end of the respective first and second pin means for minimizing the effect of said secondary thermocouple junctions.

9. A reusable interconnection cable apparatus for interconnecting a thermocouple probe sensor to a temperature monitoring apparatus comprising:

a first wire of a first thermocouple material;

a second wire of a second thermocouple material;

a conductor lead means for forming a cold junction with said first wire and having first and second ends, said first end being connected to said first wire;

cold junction compensation means for cancelling the voltage developed by said cold junction, said compensation means being connected to the second end of said conductor lead means within said connector housing, said cold junction compensation means providing a third lead;

a first connector means having a housing for housing said first and second wires, said cold junction, said cold junction compensation means, and said third lead;

said first connector means further including means for electrically connecting said third lead and said second wire with said temperature monitoring apparatus;

a cable means for conducting said first wire and said second wire out of said first connector means; and a second connector means located at said second end of said cable means for connecting said first wire and said second wire with said thermocouple probe sensor.

10. An apparatus for interconnection between a temperature monitoring apparatus and a disposable probe, said disposable probe having first and second probe leads extending from a thermocouple junction, comprising:

first and second cable leads, each for conducting an electrical signal;

means receiving said first cable lead for forming a cold junction therewith and for compensating said cold junction to provide a compensated cold junction signal;

means for housing said second cable lead and said means receiving said first cable lead and for conducting an electrical signal on said second cable lead and said compensated cold junction signal to said temperature monitor apparatus;

cable means received by said housing means for introducing said first and second cable leads into said housing means;

a first electrical connector means having first and second contacts for receiving said first and second probe leads into the interior thereof, said first and second probe leads being electrically connected respectively to said first and second contacts, forming respective first and second junctions, said first and second probe leads and first and second contacts being selected of such materials that said first and second junctions each comprise first and second secondary thermocouple means; and a second electrical connector means for mating with said first electrical connector means, said second electrical connector means having third and fourth contacts shaped to mate with said first and second contacts, respectively, said first and second cable leads being connected respectively to said third and fourth contacts, forming respective third and fourth junctions, said first and second cable leads and third and fourth contacts being selected of such materials that said third and fourth junctions comprise third and fourth secondary thermocouple junctions;

said first and second secondary junctions of said first electrical connector means being disposed to lie physically close to the respective third and fourth secondary junctions of said second electrical connector means when said first and second electrical connector means are mated, whereby the effect of said secondary junctions is minimized.

11. Apparatus for adapting either one of a thermistor probe means and a thermocouple probe means for alternate operation with a temperature monitor apparatus, said thermistor probe means having first and second terminals, said thermocouple probe means having first and second terminals, said apparatus comprising:

(a) a first reusable cable means having first, second, and third output terminals for connecting said thermistor probe means to said temperature monitor apparatus, said first reusable cable means comprising a means removably connectable to said first terminal of said thermistor means for conducting the signal from said first terminal of said thermistor means to said first output terminal, and means removably connectable to said second terminal of said thermistor means for conducting the signal from said second terminal of said thermistor means to said second and third output terminals;

(b) a second reusable cable means having first, second, and third output terminals for connecting said thermocouple means to said temperature monitor apparatus, and further including means removably connectable to the first terminal of said thermocouple means for conducting the signal therefrom to said second output terminal of said second reusable cable means, and conductor means removably connectable to the second terminal of said thermocouple means for conducting the signal therefrom;

(c) means in said second removable cable means for forming a cold junction with said conductor means;

(d) a cold junction compensation means in said second reusable cable means having first and second terminals, the first terminal of said cold junction compensation means being connected to said means for forming a cold junction;

(e) said first output terminal of said second reusable cable means being connected to the second terminal of said cold junction compensation means, said third output terminal of said second reusable cable means being connected to the first terminal of said cold junction compensation means; and (f) circuit means in said temperature monitor apparatus for receiving said first, second, and third output terminals of said first reusable cable means or, alternatively, the first, second, and third output terminals of said second reusable cable means, and for providing an output signal which, at a given temperature, is substantially the same when either the first reusable cable is used to connect said thermistor probe means to said apparatus or said second reusable cable means is used to connect said thermocouple probe means to said apparatus.

12. The apparatus of claim 11 wherein said circuit means in said temperature monitor apparatus comprises:
first, second, and third input receiving means for respectively receiving said first, second, and third output terminals of said first reusable cable means or, alternatively, said first, second, and third output terminals of said second reusable cable means;
a first resistance connected between said third input receiving means and ground;
a second resistance having a first terminal connected to ground and a second terminal; and
variable resistance means for connecting said first input receiving means to the second terminal of said second resistance and for varying the resistance between said second terminal and said first input receiving means.

13. The apparatus of claim 12 further including an input amplifier in said patient monitor apparatus, said amplifier having an input, and wherein said second input receiving means is connected to the input of said input amplifier.

* * * * *